Feb. 21, 1933.  J. ROBINSON  1,898,895
ELECTRICAL APPARATUS EMPLOYING PIEZO ELECTRIC DEVICES
Filed June 9, 1930
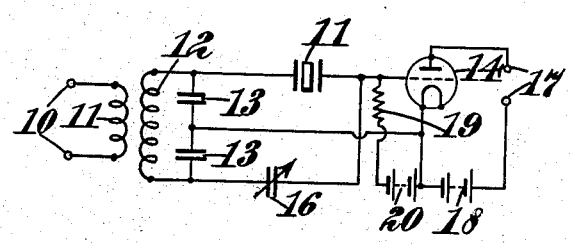
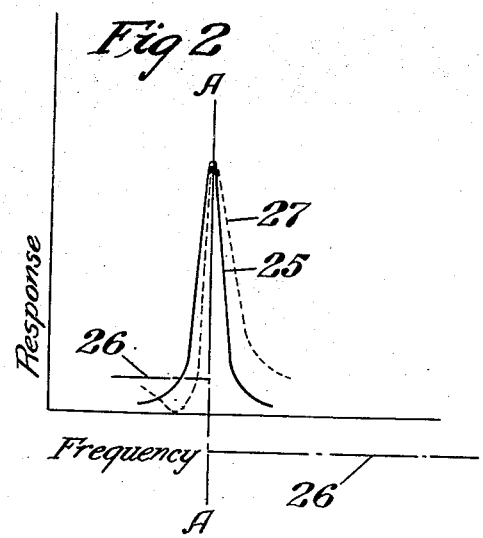

Patented Feb. 21, 1933

1,898,895

UNITED STATES PATENT OFFICE

JAMES ROBINSON, OF LONDON, ENGLAND, ASSIGNOR, BY MESNE ASSIGNMENTS, TO BRITISH RADIOSTAT CORPORATION, LIMITED, A CORPORATION OF CANADA

ELECTRICAL APPARATUS EMPLOYING PIEZO-ELECTRIC DEVICES

Application filed June 9, 1930, Serial No. 460,054, and in Great Britain July 26, 1929.

This invention is for improvements in or relating to electrical apparatus employing piezo-electric devices.

The invention is concerned with receiving apparatus for electro-magnetic waves in which a piezo-electric device is employed to provide a high degree of selectivity. The piezo-electric device being susceptible to very small changes of frequency, it will be apparent that even small values of inherent capacity of the crystal or its mounting may impair the efficiency of the apparatus. This also applies to the inherent inductance and resistance. An object of this invention is to provide means to obviate this disadvantage.

According to the invention a receiver for electro-magnetic waves comprises a piezo-electric device, a thermionic valve, one electrode of which is directly connected to one electrode of the piezo-electric device, and means for controlling the amount of energy that is passed otherwise than through the crystal piezo-electric device, so as to get least interference.

In one form of the invention a receiver for electro-magnetic waves comprises a piezo-electric device, a thermionic valve, one electrode of which is directly connected to one electrode of the piezo-electric device, and a capacity for controlling and/or balancing the energy that is passed otherwise than through the piezo-electric crystal, so as to get least interference.

Further features of the invention will be apparent from the following description taken in connection with the accompanying drawing, in which:

Figure 1 is a diagrammatic illustration of one form of receiver embodying the principles of the invention; and Figure 2 is a chart showing a receiver resonance curve and illustrating the manner in which interference is avoided.

Referring specifically to Fig. 1 of the drawing, it will be noted that the incoming energy is applied to the terminals 10 to feed a coil 11 which is electromagnetically coupled to another coil 12; alternatively, an electro-static coupling may be employed. This coil 12 is tuned by two condensers 13 connected in series across the coil and the connection between the condensers is joined to the cathode of a thermionic valve 14.

One end of the coil 12 is also connected to one electrode of a piezo-electric device 15 (such as a quartz crystal mounted between electrodes as shown) the other electrode being connected directly to a control electrode of the valve 14. The other end of the coil 12 is connected through a controlling and/or balancing condenser 16, which is adjustable, to the same control electrode as shown or to another such electrode of the valve 14. The arrangement of the condensers 13 and 16 and the piezo-electric device 15 thus constitutes an electrical bridge which may be balanced for capacity by adjustment of the condenser 16. The anode circuit of the valve includes output terminals 17 and a battery 18, and the valve is arranged to operate as a detector by the provision of a grid resistance 19 and bias battery 20.

The piezo-electric device 15 and the tuned circuit 12 and 13, 13, are both tuned to the frequency of the incoming energy, and one mode of operation is first to adjust the condenser 16 to provide a balance for the static capacity of the piezo-electric device and then to re-adjust the condenser 16 to reduce any other interference such as that causing an undesirable heterodyne effect.

The theoretical considerations underlying this method of receiving signals may be more clearly understood by reference to Figure 2 of the drawing in which a resonance curve 25 of a selective receiver is shown, the ordinates representing the response of the receiver and the abscissæ the signal frequency. The dash and dot line 26 represents the energy by-passed through the condenser 16, it being observed that the condenser is non-resonant and is therefore sensibly independent of the frequency within the relatively small range of the resonance curve of the receiver. It will be noted that the phase of this energy is shown as reversed on passing through the resonant frequency of the receiver indicated by the line A—A. This has been done merely for convenience in illustrating the effect since, as a matter of fact, it is the response of the receiver to the incoming signal which changes phase in passing through the resonant point. It can be shown, for instance, that in a mechanical resonator such as a piezo-electric crystal, the phase of the forced vibrations therein produced by an exciting electromotive force changes by 180° at the resonant point. When the exciting frequency is lower than the frequency of the crystal, the forced vibrations lead the exciting frequency, whereas the forced vibrations will lag when the exciting frequency is higher than the natural frequency of the crystal. This is equally true of any tuned circuit.

Thus, by indicating a phase reversal of the energy by-passed through the condenser 16, the actual effect can be more clearly shown and the resonance curve of the receiver may assume the conventional form.

It will be noted that when the energy, which is represented by the line 26, is combined with the energy passing through the crystal in opposed phase, the resultant energy response of the receiver will follow approximately the dash line 27 and the resonance curve of the receiver will be distorted or shifted slightly so as to afford greater selectivity as regards signals of a lower frequency than the resonant frequency of the receiver at a slight sacrifice of selectivity as regards signals of higher frequency than the resonant frequency. Thus, if a heterodyne note results from interference between a wanted signal and a signal of lower frequency, the capacity 16 may be increased to an amount slightly greater than that required to balance out the capacity effect of the crystal and holder and the distortion of the resonance curve will be sufficient to eliminate or substantially eliminate the resulting beat note.

On the other hand, if the capacity of the crystal is decreased to an amount less than that required to balance the crystal capacity, the resonance curve of the receiver will be shifted to the other side so that the interference between the wanted signal and a signal of slightly higher frequency may be eliminated. This will be evident from the fact that the energy passing through the crystal by reason of the capacity of the holder will be of reversed phase from that which passes through the condenser 16 and thus the line 26 representing the additional energy will be below the datum line for the lower frequencies and above this line for the higher frequencies.

The device shown may be combined with amplifiers preceding and following it and by way of example the device may be employed in the intermediate frequency stage of a super-heterodyne receiver. Also the valve 14 may be operated as an amplifier, with a separate detector following it if required.

It will be understood that the invention is not restricted to the precise details of the specific example shown in the drawing; for instance, two valves may be employed with their cathodes connected together, a control electrode of one valve connected to the piezo-electric device, a control electrode of the other valve connected to the condenser 16 and an output circuit common to both valves. Furthermore, a quartz crystal without piezo-electric effect may be employed as a dielectric for the condenser 16.

I claim:—

1. In the art of receiving wave form signals the method of eliminating a heterodyne note resulting from interference between two signals of closely adjacent frequencies, which comprises selecting, from the received signal energy, the energy which is mainly of the frequency of one of said signals, separating a relatively small amount of the total received signal energy and combining said small amount of energy in phase opposition with the said selected signal energy.

2. In the art of receiving wave form signals the method of eliminating a heterodyne note resulting from interference between two signals of closely adjacent frequencies which comprises selecting, from the total received signal energy, the energy which is mainly of the frequency of one of said signals but also an unwanted portion of energy of the frequency of the other of said signals, separating a relatively small amount of the total received signal energy and combining this small amount of energy in phase opposition with the said selected signal energy to balance out the said unwanted portion of this selected energy.

3. In the art of receiving wave form signals with a piezo-electric resonant device having shunt capacity, the method of eliminating a heterodyne note resulting from interference between two signals of closely adjacent frequencies which comprises selecting from the total received signal energy by said piezo-electric device the energy which is mainly of the frequency of one of said signals and an unwanted portion of energy of the frequency of the other of said signals, by-passing a portion of the total received energy through a capacitative path of lesser impedance than the capacitative impedance of the piezo-electric device, and combining the resultant energy in opposite phase to balance out the unwanted portion of the selected energy.

4. In the art of receiving wave form signals with a piezo-electric resonant device having shunt capacity, the method of eliminating a heterodyne note resulting from interference between two signals of closely adjacent frequencies which comprises selecting from the total received signal energy by said piezo-electric device the energy which is mainly of the frequency of one of said signals and an unwanted portion of energy of the frequency of the other of said signals, by-passing a portion of the total received energy through a capacitative path of greater impedance than the capacitative impedance of the piezo-electric device, and combining the resulant energy in opposite phase to balance out the unwanted portion of the selected energy.

In testimony whereof I have signed my name to this specification.

JAMES ROBINSON.